United States Patent [19]

Hwang et al.

[11] Patent Number: 6,099,118

[45] Date of Patent: Aug. 8, 2000

[54] STRUCTURE OF EYEGLASSES

[76] Inventors: Woei-Jyh Hwang; Woei-Jer Hwang, both of PO Box 82-144, Taipei, Taiwan

[21] Appl. No.: 09/452,175

[22] Filed: Dec. 1, 1999

[51] Int. Cl.$^7$ ...................................................... G02C 1/08
[52] U.S. Cl. ............................................... 351/94; 351/90
[58] Field of Search .................................. 351/90, 91, 92, 351/93, 94, 95, 96, 97, 98, 99, 100, 124, 125, 130, 133, 101, 41

[56] References Cited

U.S. PATENT DOCUMENTS

| | | | |
|---|---|---|---|
| 2,551,144 | 5/1951 | Lindemann et al. | 351/90 |
| 4,674,852 | 6/1987 | Tanaka | 351/90 |
| 6,036,308 | 3/2000 | Lin | 351/90 |

*Primary Examiner*—Hung Xuan Dang
*Attorney, Agent, or Firm*—A & J

[57] ABSTRACT

A pair of eyeglasses includes a pair of temples, a pair of hinges each having an end pivotally connected with a respective one of the temples and another end formed with a first recess, a rim composed of an upper portion and a lower portion and having two opposite sides provided with two projections each configured to be fitted into the recess, a bridge having two ends each formed with a second recess configured to receive a respective one of the projections, and a pair of nose pads connected with the projections, whereby the eyeglasses can be easily assembled and disassembled thereby decrease the manufacturing cost and facilitating maintenance and replacement of component parts.

1 Claim, 5 Drawing Sheets

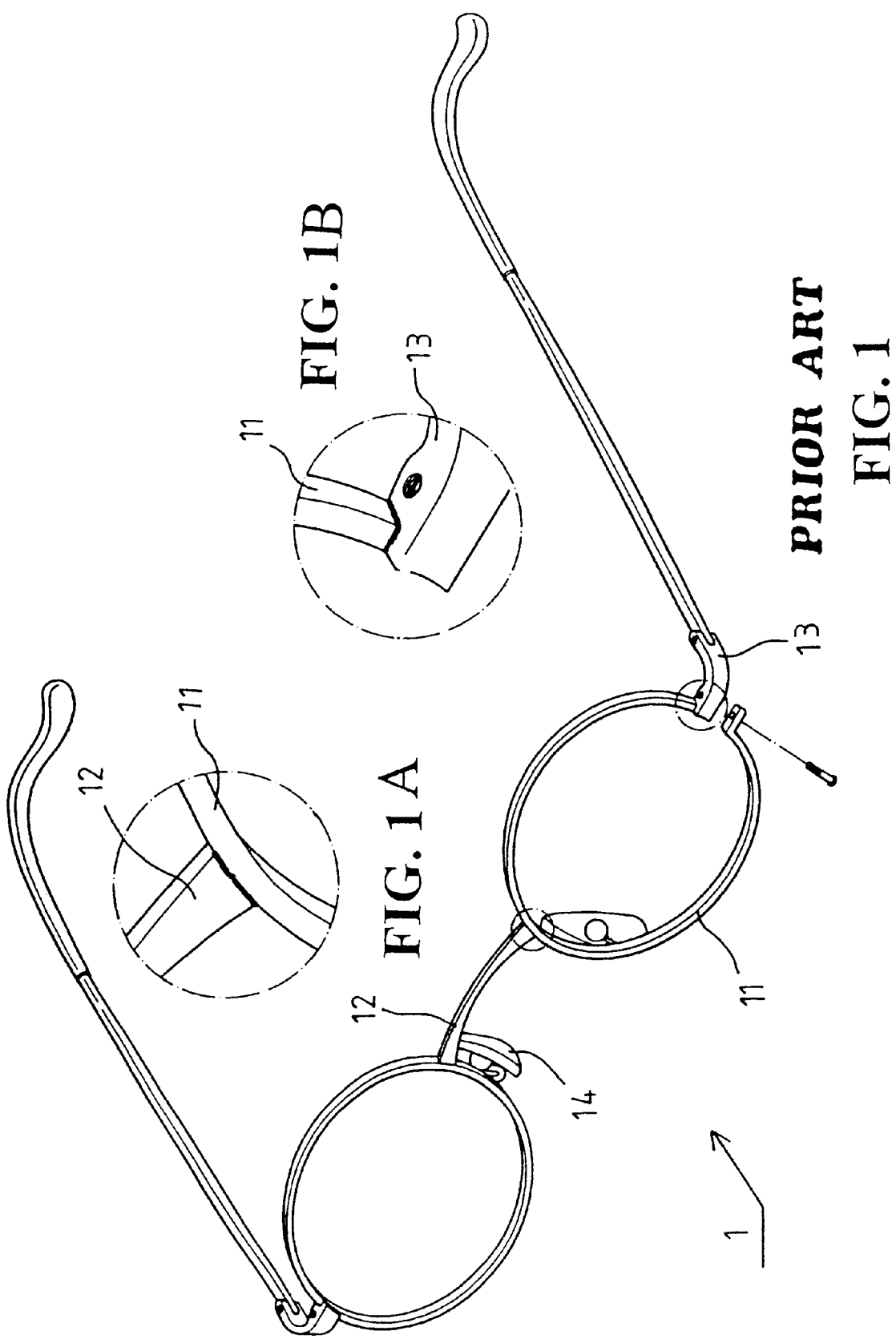

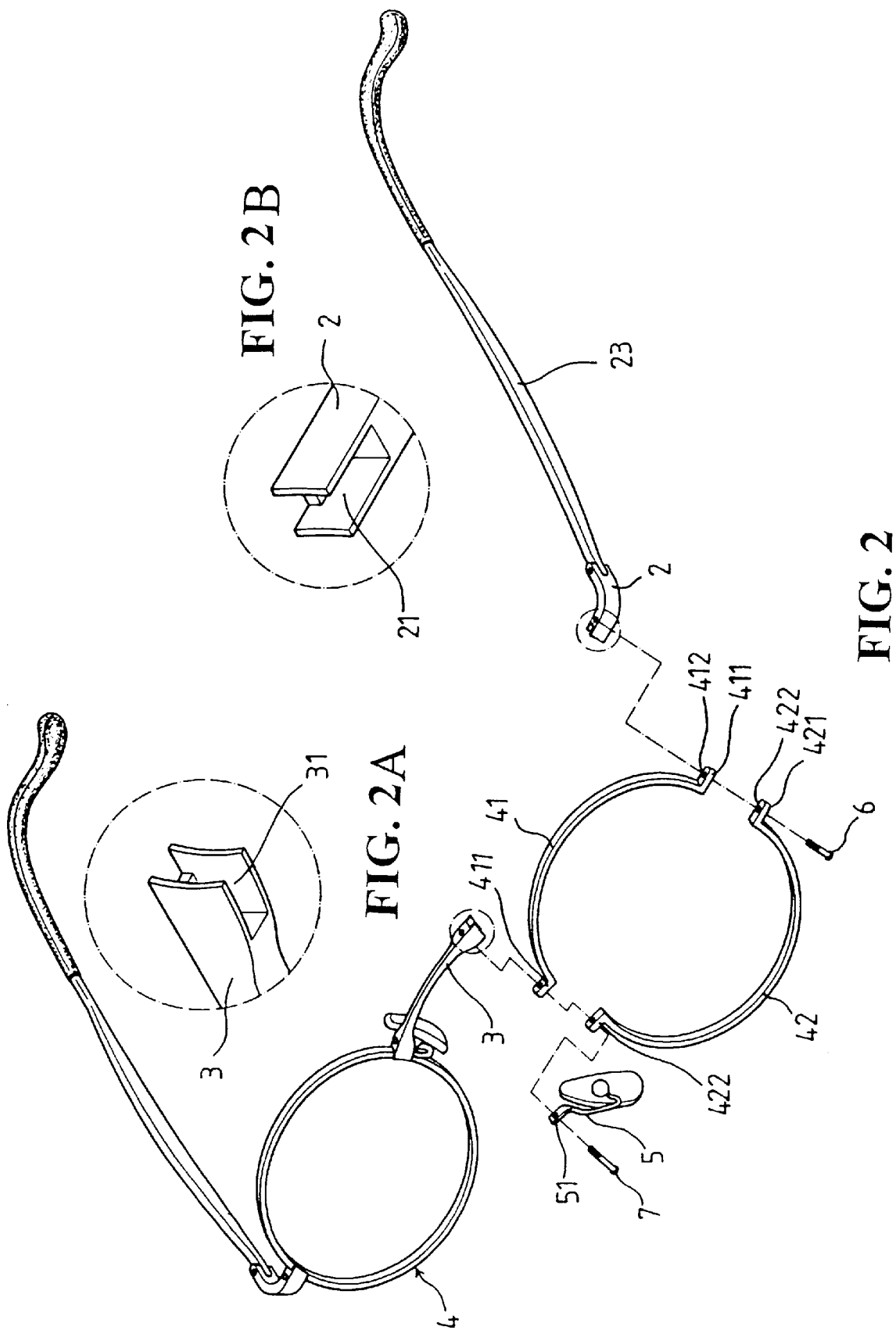

6,099,118

STRUCTURE OF EYEGLASSES

BACKGROUND OF THE INVENTION

1. Field of the Invention

This invention is related to eyeglasses and in particular to an improvement in the structure of eyeglasses which are easily assembled.

2. Description of the Prior Art

The conventional eyeglasses are too heavy for the user to feel comfortable in wearing them, and so it has been long been hoped to have lightweight eyeglasses to obviate this drawback. Hence, titanium and titanium alloys are used to decrease the weight of eyeglasses. As shown in FIG. 1, the eyeglasses 1 made of titanium or titanium alloy generally comprise two rims 11, a bridge 12, two hinges 13 and two nose pads 14 which are joined together by welding. However, it is difficult to weld titanium parts together thus often causing failure in joining the titanium parts and therefore increasing the cost.

Therefore, it is an object of the present invention to provide an improvement in the structure of eyeglasses which can obviate and mitigate the above-mentioned drawbacks.

SUMMARY OF THE INVENTION

This invention is related to an improvement in the structure of eyeglasses.

According to a preferred embodiment of the present invention, a pair of eyeglasses includes a pair of temples, a pair of hinges each having an end pivotally connected with a respective one of the temples and another end formed with a first recess, a rim composed of an upper portion and a lower portion and having two opposite sides provided with two projections each configured to be fitted into the recess, a bridge having two ends each formed with a second recess configured to receive a respective one of the projections, and a pair of nose pads connected with the projections, whereby the eyeglasses can be easily assembled and disassembled thereby decrease the manufacturing cost and facilitating maintenance and replacement of component parts.

It is the primary object of the present invention to provide an improvement in the structure of eyeglasses which can be easily assembled and disassembled.

It is another object of the present invention to provide an improvement in the structure of eyeglasses which can facilitate maintenance and replacement of component parts.

It is still another object of the present invention to provide an improvement in the structure of eyeglasses which do not need welding operation in assembly.

It is still another object of the present invention to provide an improvement in the structure of eyeglasses which are simple in construction.

It is a further object of the present invention to provide an improvement in the structure of eyeglasses which are low in cost.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1 is a perspective view of prior art eyeglasses;

FIG. 1A is an enlarged view of a portion of FIG. 1;

FIG. 1B is an enlarged view of another portion of FIG. 1;

FIG. 2 is an exploded view of eyeglasses according to the present invention;

FIG. 2A is an enlarged view of a portion of FIG. 2;

FIG. 2B is an enlarged view of another portion of FIG. 2;

DETAILED DESCRIPTION OF THE PREFERRED EMBODIMENT

Figure 3A:
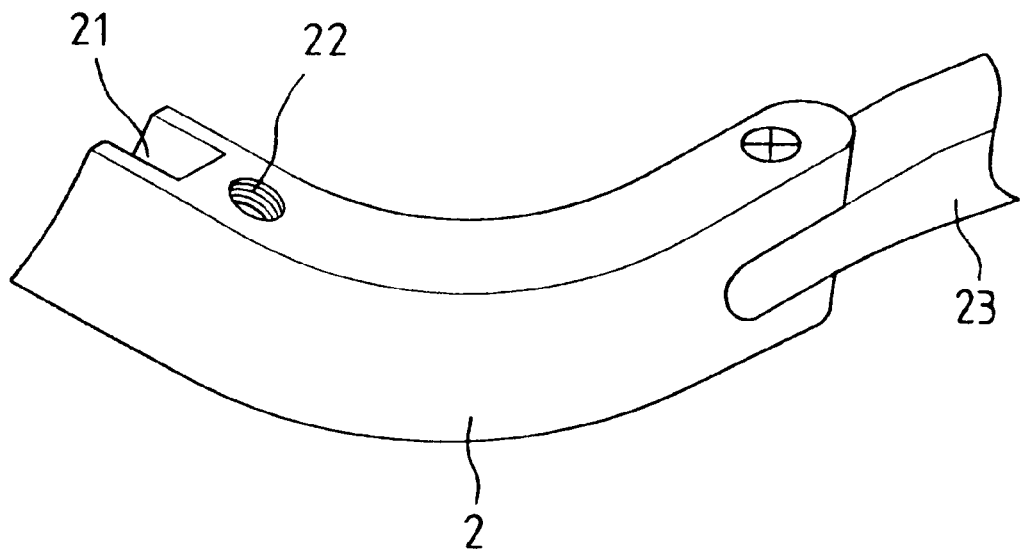
FIG. 3A is an enlarged view of the hinge.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 5:
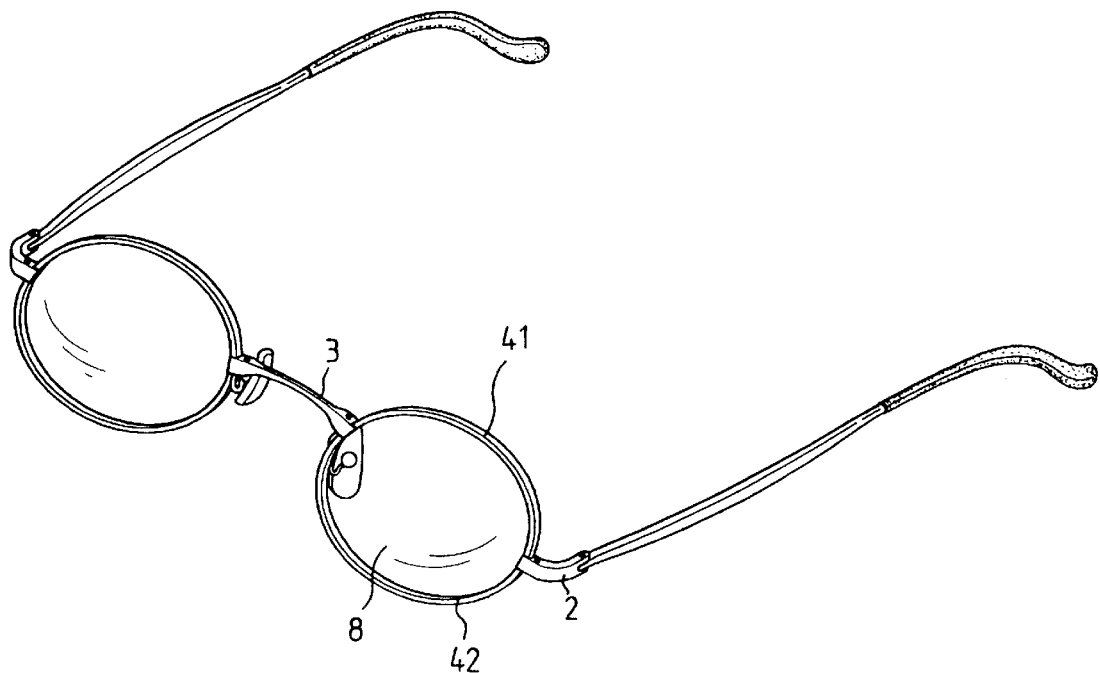
FIG. 5 is a perspective view of eyeglasses according to the present invention.

With reference to the drawings and in particular to FIGS. 2, 3 and 5 thereof, the eyeglasses according to the present invention generally comprises a pair of hinges 2, a bridge 3, a pair of rims 4, a pair of temples 23.

Figure 3B:
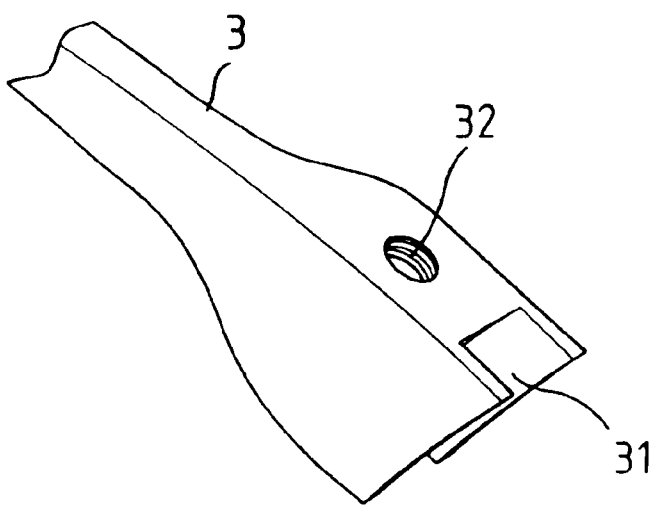
FIG. 3B is an enlarged view illustrating the structure of the bridge.

Each of the hinges has an end pivotally connected with a respective one of the temples 23 and another end formed with a recess 21 and a threaded hole 22 behind the recess 21 (see FIGS. 2 and 3A).

Each of the rims 4 is composed of an upper portion 41 and a lower portion 42 which are respectively formed with two projections 411 and 421 at two ends thereof. The projections 411 and 421 are formed with threaded holes 412 and 422, respectively (see FIGS. 2 and 3B).

A pair of nose pads 5 are each fitted to a respective one of the projections 422 by a screw 7 extending through a threaded hole 51 and the threaded holes 422 and 412 of the projections 421 and 411.

The bridge 3 is formed with a recess 31 at both ends configured to receive the projections 411 and 421 of the rims 4.

Figure 4A:
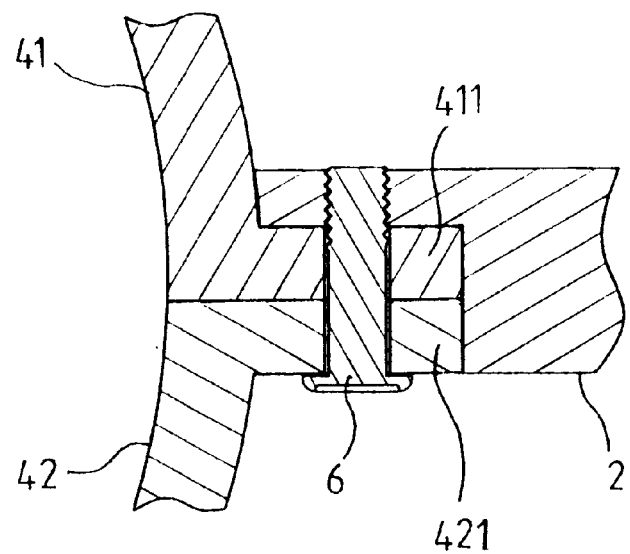
FIG. 4A is a sectional view illustrating the engagement between the hinge and the rims.
Figure 4B:
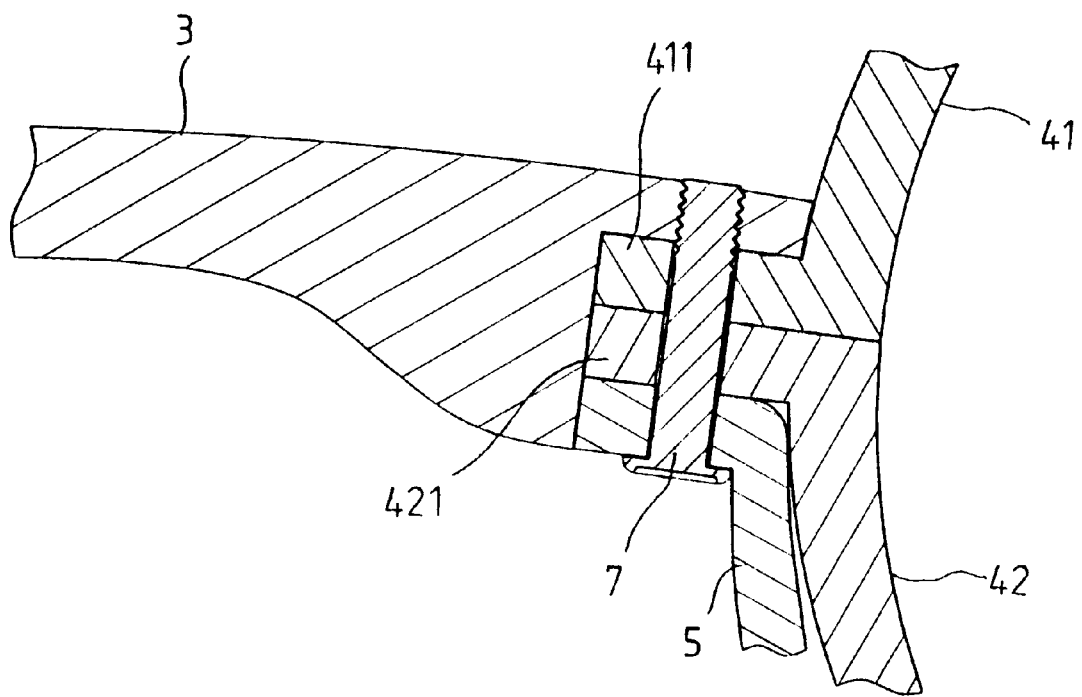
FIG. 4B is a sectional view illustrating the engagement between the bridge and the rims.

As shown in FIG. 4A, the outer projections 411 and 412 of the upper and lower portions 41 and 42 of the rims 4 are first fitted into the recess 21 of the hinge 2 and then joined together by a screw 6 extending through the threaded holes 422 and 412 of the projections 421 and 411 and the threaded hole 22 of the hinge 2. As shown in FIG. 4B, the inner projections 411 and 412 of the upper and lower portions 41 and 42 of the rims 4 are first fitted into the recess 31 of the bridge 3 and then joined together by a screw 7 extending through the threaded hole 51 of the nose pad 5, the threaded holes 422 and 412 of the projections 421 and 411 and the threaded hole 22 of the hinge 2.

When required to fit the lens 8 into the rim 4 or remove the lens 8 from the rim 4, it is only necessary to loosen the screws 6 and 7, place the lens 8 into the rim 4 and then tighten the screws 6 and 7 (see FIG. 5) thereby facilitating maintenance of eyeglasses and replacement of lenses.

Figure 6:
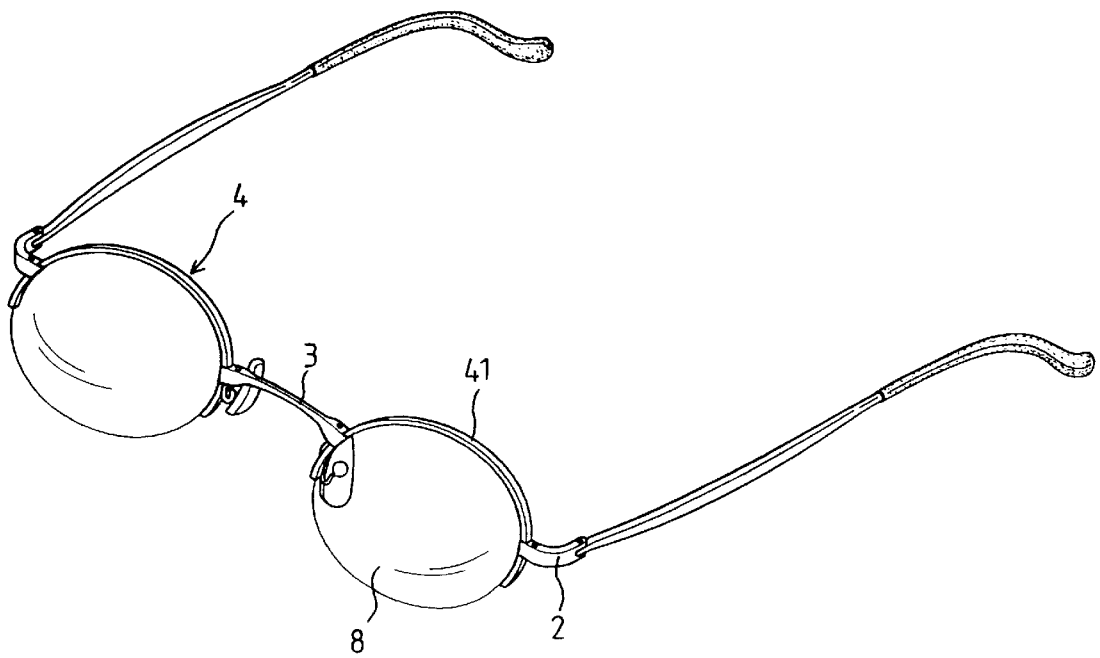
FIG. 6 is a perspective view of eyeglasses according to another preferred embodiment according to the present invention.

FIG. 6 is a perspective view of eyeglasses according to another preferred embodiment according to the present invention. As illustrated, the lens 8 may be held in place by the upper portion 41 of the rim 4 thus providing enabling the eyeglasses to be changed in appearance as desired.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is:

1. A pair of eyeglasses comprising:

a pair of temples;

a pair of hinges each having an end pivotally connected with a respective one of said temples and another end formed with a first recess;

a rim composed of an upper portion and a lower portion and having two opposite sides provided with two projections each configured to be fitted into said recess;

a bridge having two ends each formed with a second recess configured to receive a respective one of said projections; and a pair of nose pads connected with said projections.

* * * * *